B. OWEN.

Horse Hay-Rake.

No. 6,617. Reissued Aug. 24, 1875.

WITNESSES;
Henry Bornbusch.
E. R. Ealy

INVENTOR;
Benjamin Owen
by his Atty.
Chas. M. Beck

N. PETERS, PHOTO-LITHOGRAPHER, WASHINGTON, D. C.

UNITED STATES PATENT OFFICE.

BENJAMIN OWEN, OF DAYTON, OHIO.

IMPROVEMENT IN HORSE HAY-RAKES.

Specification forming part of Letters Patent No. 159,349, dated February 2, 1875; reissue No. 6,617, dated August 24, 1875; application filed March 13, 1875.

*To all whom it may concern:*

Be it known that I, BENJAMIN OWEN, of Dayton, in the county of Montgomery and State of Ohio, have invented new and useful Improvements in Horse Hay-Rakes; and I do hereby declare that the following is a full and exact description of the same, reference being had to the accompanying drawings, and to the letters of reference marked thereon.

The nature of my invention consists, first, in the construction, combination, and arrangement of a hand-lever and a locking foot-lever in such a manner that a part of the former serves as a bearing for the latter, as will be hereafter shown; second, in the construction and arrangement of the rake-head, and the manner of securing the teeth thereto.

In order to enable others skilled in the art to which my invention appertains to make and use the same, I would thus proceed to describe its construction and operation, referring to the accompanying drawings, in which—

Figure 1:
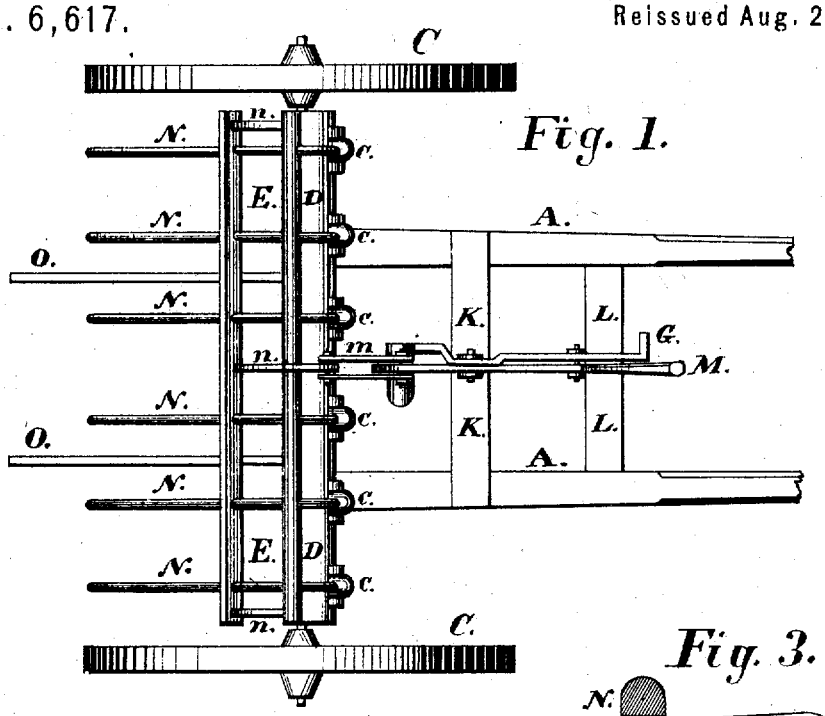
Figure 3:
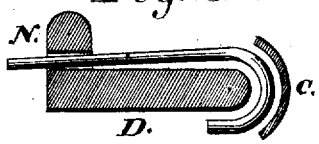
Figure 4:
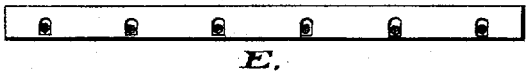
Figure 2:
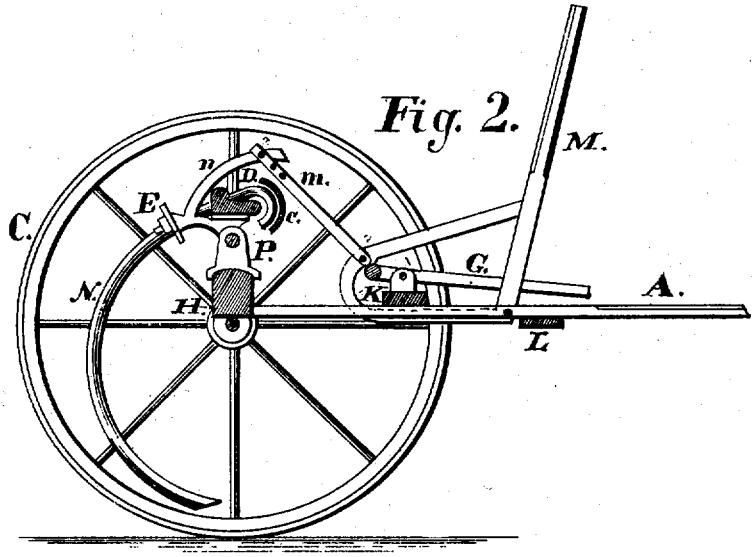

Figure 1 is a top view of a horse hay-rake provided with my improvements. Fig. 2 is a side elevation of the same in a line with axle, and with a wheel removed to exhibit the operating devices. Fig. 3 represents the manner of holding the tooth to the front bar of the rocking-frame.

The following is a description of my improvements, with such additions as are necessary to explain their application.

A are the thills, H the axle, and C the wheels, constructed and connected in the ordinary manner. On top of the axle are bolted three bearing-blocks, P, to which a like number of arms, *n*, are pivoted, to give support to the front bar D and the rear guide-bar E. The central arm has a supplemental arm, *n*, extending from the guide-bar E forward and over the front bar, where it is connected, by bars *m*, to the hand-lever M. The shafts have two cross-bars, L and K, situated just in front of the axle to support the devices for operating the rake-head and the driver's seat, not shown in the drawing, but occupying its customary position. M represents the hand-lever, which is pivoted at its bottom, so as to admit of a backward-and-forward motion to the rear edge of the forward cross-bar L. Proceeding from this lever at its bottom is a rearwardly-projecting arm, which passes under the bar K, is curved upward in the manner shown, passes forward, and is united to the hand-lever at a point about two-thirds of its length from the top. The foot-lever G, Figs. 1 and 2, is pivoted in suitable bearings upon the top of the bar K. Its rear end, which is very short, has a projection to the right bearing upon the inner edge of the upward-curved arm of the hand-lever M, just under the point at which the bars *m* are pivoted to this lever. The forward part of the foot-lever projects just beyond the bar L, and has a stirrup for the foot extending to the left.

I thus secure the teeth to the rake-head, which is of a peculiar construction: The front bar D, which is fastened to the pivoted arms *n'*, is composed of a horizontal and a vertical part. (Shown in cross-section in Fig. 2.) The front surface of the horizontal part is rounded, and the vertical is perforated for the teeth to pass through. The orifices are round, and only slightly larger than the diameter of the teeth. The rear bar or guide-bar E, which is fastened to the projecting arms *n'*, has a series of vertical slots, of a little greater width than the diameter of the teeth through which the teeth pass, seriatim, and by which they are limited to a vertical movement, depending on the length of the slots. The teeth properly curved, in the usual manner, are passed through the orifices of the front bar D, and through the vertical slots of the guide-bar E. Their forward ends are curved to fit the rounded part of the bar D, and are held to it by clips *c*, (seen in Fig. 1,) and in cross-section in Figs. 2 and 3. These clips have semi-circular grooves curved to fit snugly over the ends of the teeth, and are secured to the rounded part of the bar D by wood-screws passing through their ears, Fig. 1. The cleaners O are adjusted in the ordinary manner.

I am aware that the teeth of horse hay-rakes have been secured to a circular bar by being passed, first, through staples on the under side of the said bar, and then curved up and around the bar, and held by a second set of staples; but in such fastenings the staples, not the bar, bear all the strain that may be put upon the teeth. In my fastening the strain consequent upon use of the rake is first felt at the orifices of the bar D, which become fulcrum-points. As it increases the pressure is distributed evenly over the top and forward side of the bar until the teeth reach the upper ends of the slots in the guide-bar E, which then aids in sustaining them.

Supposing the driver to be seated, I would thus describe the operation of the rake. While gathering the loads for each windrow his foot is held firmly upon the foot-lever G, thereby effectually locking the rake-head and keeping the teeth down to their work. In passing the windrow he grasps the hand-lever M, drawing it toward him. The teeth are elevated and the hay discharged. As the teeth fall back into position to rake, the rearwardly-projecting bottom arm of the hand-lever comes in contact with the cross-bar K, and prevents the further downward movement of the teeth.

Having fully described my invention, I claim and desire to secure by Letters Patent—

1. The hand-lever M, having two arms joined at the outer ends, the upper of which serves as a bearing for the projecting end of the foot-lever G, and the lower comes in contact with the bar K of the shafts, substantially as described, and for the purpose specified.

2. The combination of the hand-lever M, constructed as described, with the foot-lever G, bars *m*, and the tilting head of a horse hay-rake, when the respective parts are arranged, as and for the purpose specified.

3. The bar D, having its forward edge rounded, as shown, and the slotted guide-bar E, forming a rigid portion of the rake-head, in combination with the teeth N, passed through the bar E, and the orifices in the vertical portion of the bar D, and secured to its rounded edge by means of the clips *c*, which allow them a slight vertical, but very little lateral, motion, substantially as described, and for the purpose specified.

Witness my hand this 9th day of March, A. D. 1875.

BENJ. OWEN.

Witnesses:
E. THOMPSON,
CHAS. M. PECK.